US012662973B2

(12) United States Patent
Henrion et al.

(10) Patent No.: US 12,662,973 B2
(45) Date of Patent: Jun. 23, 2026

(54) METHOD FOR ACTUATING AN INJECTOR, AND CONTROL UNIT

(71) Applicant: Robert Bosch GmbH, Stuttgart (DE)

(72) Inventors: Thibault Jean Roger Henrion, Bergheim bei Salzburg (AT); Alexander Fuchs, Adnet (AT); Florian Moesenbichler, Abersee (AT)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 18/871,980

(22) PCT Filed: Jun. 5, 2023

(86) PCT No.: PCT/EP2023/064914
§ 371 (c)(1),
(2) Date: Dec. 5, 2024

(87) PCT Pub. No.: WO2023/237461
PCT Pub. Date: Dec. 14, 2023

(65) Prior Publication Data

US 2025/0361843 A1 Nov. 27, 2025

(30) Foreign Application Priority Data

Jun. 7, 2022 (DE) .................... 10 2022 205 734.1

(51) Int. Cl.
*F02D 41/24* (2006.01)
*F02M 57/00* (2006.01)

(52) U.S. Cl.
CPC ....... *F02D 41/2467* (2013.01); *F02M 57/005* (2013.01); *F02D 2200/0602* (2013.01)

(58) Field of Classification Search
CPC .. F02D 41/2467; F02D 41/2451; F02D 41/20; F02D 2200/0602; F02D 41/30;
(Continued)

(56) References Cited

U.S. PATENT DOCUMENTS 10,961,945 B1 * 3/2021 Han ........................ F02D 41/22
2012/0048239 A1 * 3/2012 Jalal .................... F02D 41/2096 123/472
(Continued)

FOREIGN PATENT DOCUMENTS

DE 102006034514 A1 1/2008
DE 102010016079 A1 11/2010
(Continued)

OTHER PUBLICATIONS

Translation of International Search Report for Application No. PCT/EP2023/064914 dated Oct. 5, 2023 (3 pages).

*Primary Examiner* — Grant Moubry
(74) *Attorney, Agent, or Firm* — Michael Best & Friedrich LLP

(57) ABSTRACT

The invention relates to a method for actuating an injector (1), in particular a fuel injector, wherein the stroke movement of a nozzle needle (2) for opening and closing at least one injection opening (3) is controlled by means of the pressure in a control chamber (4), and the pressure in the control chamber (4) is measured by means of a pressure sensor (5) integrated into the injector (1), wherein characteristic information, in particular time and volume flow rate data, is derived from the sensor signals from the pressure sensor (5) for the stroke movement of the nozzle needle (3) and is used to correct an injection rate model that is based on previously measured time and volume flow rate data.

10 Claims, 10 Drawing Sheets

(58) Field of Classification Search
CPC . F02M 57/00; F02M 57/005; F02M 2200/247
See application file for complete search history.

(56) References Cited

U.S. PATENT DOCUMENTS

| | | | | |
|---|---|---|---|---|
| 2015/0013647 | A1* | 1/2015 | Zhang | F02D 41/2096 123/478 |
| 2016/0201594 | A1* | 7/2016 | Matsubara | F02D 41/38 123/299 |
| 2018/0216560 | A1* | 8/2018 | Hauser | F02D 41/20 |
| 2019/0170081 | A1* | 6/2019 | Komatsu | F02B 3/06 |
| 2019/0234338 | A1* | 8/2019 | Satria | F02D 41/2467 |

FOREIGN PATENT DOCUMENTS

| | | | |
|---|---|---|---|
| DE | 102010016078 | A1 | 12/2010 |
| DE | 102009029549 | A1 | 3/2011 |
| DE | 102012100069 | A1 | 7/2012 |
| DE | 102014204098 | A1 | 9/2015 |
| DE | 102015207307 | A1 | 10/2016 |
| DE | 102015219673 | A1 | 4/2017 |
| DE | 102015219741 | A1 | 4/2017 |
| DE | 102017211582 | A1 | 1/2019 |
| DE | 102018129855 | A1 | 6/2019 |
| DE | 102011053839 | B4 | 9/2019 |
| DE | 112011101723 | B4 | 2/2020 |
| DE | 102012204272 | B4 | 10/2021 |
| EP | 3165750 | A1 | 5/2017 |

* cited by examiner a)

b)

c)

a)

b)

c)

METHOD FOR ACTUATING AN INJECTOR, AND CONTROL UNIT

BACKGROUND

The invention relates to a method for actuating an injector, in particular a fuel injector for injecting fuel under high pressure into a combustion chamber of an internal combustion engine.

The invention furthermore relates to a control unit for carrying out the method.

From the prior art, fuel injectors with a nozzle needle arranged longitudinally in a pressure chamber for opening and closing at least one injection opening are known in which the movements of the nozzle needle are servo-hydraulically controlled, i.e. by means of the pressure in a control chamber that applies a hydraulic closing force to the nozzle needle. Control of the pressure in the control chamber is accomplished by means of a control valve that regulates the pressure in the control chamber electromagnetically or by means of a piezoelectric actuator. The control valve can be controlled very precisely by a control unit. However, there is a time delay between the control current and the actual movement of the nozzle needle. For precise actuation, it is therefore important to know the exact time at which the nozzle needle moves and the injection begins to control the control current for actuation of the control valve, if necessary.

The movement of the nozzle needle can be captured via the pressure curve in the control chamber, for example. In DE 10 2015 207 307 A1, a fuel injector with a servo-hydraulically controlled nozzle needle and a pressure sensor is proposed for this purpose. With the aid of the pressure sensor, pressure changes can be captured in the control chamber or in a pressure chamber hydraulically connected to the control chamber. By evaluating the pressure signals of the pressure sensor, the exact time at which the nozzle needle opens and closes can be determined. If necessary, the control signal for actuating the control valve can thus be readjusted.

The time curve of the pressure in the control chamber of a servo-hydraulic injector provides precise information about the movement of the nozzle needle. By employing algorithms for signal analysis, characteristic times of injection such as the start of injection, the end of injection, or the needle opening time can be determined. In these algorithms, combinations of digital filtering, threshold methods, and numerical derivation are typically applied.

During the operation of an internal combustion engine, injection rate models are typically used to regulate the amount of fuel injected with greater accuracy as well as optimize combustion parameters. Due to the lower computing power, 0D models are preferred over 1D models, for example. The models generally use a highly simplified representation of the injection rate curve, for example in the form of a trapezoid as exemplarily shown in FIG. 11. However, the measured actual curve (solid line) has deviations from the model (dashed line) so that the forecast of injection amount by the model is inaccurate.

To increase accuracy, it has therefore already been proposed that the absolute pressure or pressure differences from the sensor signal of a pressure sensor integrated in the injector should be used to estimate the injection quantity. However, as a result of wear processes, the sensor signal amplitude of the pressure sensor changes over the life of the injector, so that this change affects the accuracy of the estimation. If the calculation of the maximum injection rate is also performed by means of a fixed linear correlation to the pressure drop, this correlation changes over time due to drift/wear of the pressure sensor, resulting in a systematic error in the injection quantity estimate.

SUMMARY

The present invention is therefore concerned with the task of increasing the accuracy of the model-based injection amount estimate.

In order to solve this problem, the method having the features of the disclosure is proposed. In addition, a control unit for carrying out the method is specified.

A method for actuating an injector, in particular a fuel injector, in which the stroke movement of a nozzle needle for opening and closing at least one injection opening is controlled by means of the pressure in a control chamber and the pressure in the control chamber is measured by means of a pressure sensor integrated into the injector. From the sensor signals of the pressure sensor, characteristic information, particularly time and volume flow rate data, for the stroke movement of the nozzle needle is derived and used to correct an injection rate model based on previously measured time and volume flow rate data.

The proposed method uses a measured and thus "real" injection rate curve instead of a simplified curve, for example in the form of a trapezoid, as a model for a correction function. This has the advantage that model errors are reduced to a minimum. For the modeling of the injection rate, the measurement data of a nominal injector are preferably used. These are preferably comprised of time and volume flow rate data with a defined sampling frequency.

The modeling consists primarily of the variation or adjustment of the time and volume flow rate data using the information derived from the sensor signal of the pressure sensor. These are used to parameterize and correct the injection rate model.

The correction is made during operation of the injector, preferably over the entire service life of the injector. In this way, an injector-specific actuation can be realized that takes into account the actual wear state of the injector.

Preferably, the following information, particularly time and volume flow rate data, is derived from the sensor signal of the pressure sensor and used to correct the injection rate model:

Start of opening movement of nozzle needle (NOS),
End of opening movement of nozzle needle (NOE),
Start of closing movement of nozzle needle (NCS),
End of closing movement of nozzle needle (NCE) and maximum injection rate (Qmax).

Furthermore, preferably only this information is derived from the sensor signal of the pressure sensor in order to parameterize and correct the injection rate model. In particular, the use of the sensor signal amplitude is omitted, as this changes over time—as already mentioned at the beginning—due to aging and wear of the pressure sensor. The independence from the absolute sensor signal amplitude increases the accuracy of the model, in particular in comparison to the prior art mentioned at the beginning.

Time data NOS, NOE, NCS and NCE may be derived from the sensor signal of the pressure sensor using a detection algorithm. The detection algorithm can use derivatives and/or averages of the sensor signal. In addition, the sensor signal can be pre-processed in advance, in particular filtered, for example by means of a low-pass filter.

The maximum injection rate Qmax is preferably determined from the time data NOS, NOE, NCS and NCE. In this way, changes in the maximum injection rate of Qmax over time caused by aging/wear of the injector are captured.

It has been found that correlations exist between time data NOS, NOE, NCS, NCE, maximum injection rate Qmax and nozzle needle stroke. These can be identified using conventional methods with linear equations or by employing artificial intelligence with neural networks and utilized to determine Qmax. It has also been demonstrated that these correlations are independent of other wear parameters, such as wear of the nozzle needle seat and/or changes in flow ratios in the area of a throttle plate limiting the control chamber. The correlations are preferably determined experimentally in advance and stored, preferably in a control unit.

The quantity Qmax determined from the time data NOS, NOE, NCS, NCE is then further preferably used as the input quantity in the injection rate model.

Furthermore, a corrected curve of the injection rate is then preferably calculated by mathematical transformation of the time and volume flow rate data derived from the sensor signal of the pressure sensor. In particular, linear transformation can be applied. To further increase the accuracy, the transformation can be performed with different mathematical models, for example polynomial, exponential, or logarithmic, and/or only via a given portion of the opening or closing phase.

In the mathematical transformation of the time data, only the time data NOS, NOE, NCS, NCE derived from the sensor signal of the pressure sensor are preferably used. That is to say that only this time data are used to avoid errors or inaccuracies.

The corrected injection rate model is then further preferably used for calculating the injection amount, preferably by integrating the corrected curve of the maximum injection rate Qmax. The calculated injection amount may then be converted to a change in the electric actuation duration. The determined deviation of the actual injection amount can be applied as a factor to the injection duration.

In addition, a control unit that is configured so as to carry out the method according to the invention is proposed. In the control unit, an injection rate model is preferably stored for this purpose, which is based on the measurement data of a nominal injector. To correct the injection rate model, the control unit evaluates the sensor signal from the pressure sensor. A detection algorithm can be saved in the control unit for this purpose with the help of which the relevant time and volume flow rate data can be derived from the sensor signal. If the evaluation allows a drift or wear to be detected, the injection rate model can be corrected accordingly using the control unit.

BRIEF DESCRIPTION OF THE DRAWINGS

The method according to the invention and its advantages are explained in more detail below with reference to an example and the accompanying drawings. In the drawings.

DETAILED DESCRIPTION

Figure 2:
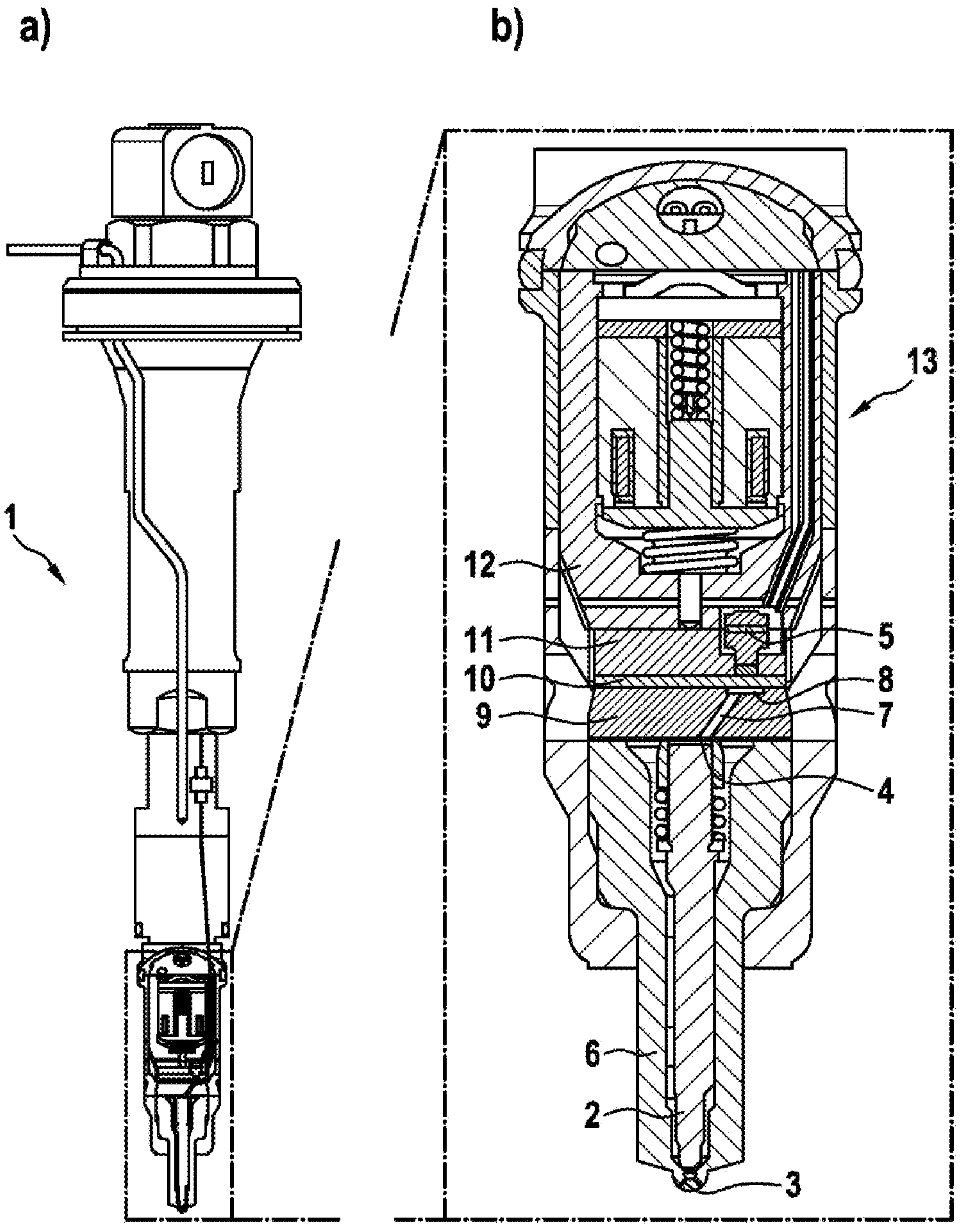

The method according to the invention is used to actuate an injector 1 with a servo-hydraulically controlled nozzle needle 2 and a pressure sensor 5 for measuring the control pressure abutting the nozzle needle 2. Such an injector 1 is shown by way of example in FIG. 2. FIG. 2*a*) shows the complete injector 1, FIG. 2*b*) only the area of the nozzle and the control valve.

The injector 1 shown in FIG. 2 comprises a nozzle needle 2, which is accommodated in a nozzle body 6 so that it can move, for opening and closing at least one injection opening 3. The end of the nozzle needle 2 facing away from the injection opening 3 limits a control chamber 4, which is hydraulically connected to a pressure chamber 8 via a channel 7. The pressure chamber 8 is formed in a throttle plate 9 and is limited by a diaphragm 10 abutting the throttle plate 9, behind which a pressure sensor 5 is arranged, so that pressure changes occurring in the pressure chamber 8 can be captured with the aid of the pressure sensor 5. The pressure sensor 5 is integrated into a valve plate 11, which in turn abuts a valve body 12 of a control valve 13. Actuation of the control valve 13 results in a change in the pressure in the control chamber 4, which exerts a hydraulic force acting in the closing direction on the nozzle needle 2. The pressure in the control chamber 4 thus controls the stroke movement of the nozzle needle 2. Accordingly, information characteristic of the stroke movement of the nozzle needle 2 can be derived from the sensor signal of the pressure sensor 5.

Figure 3:
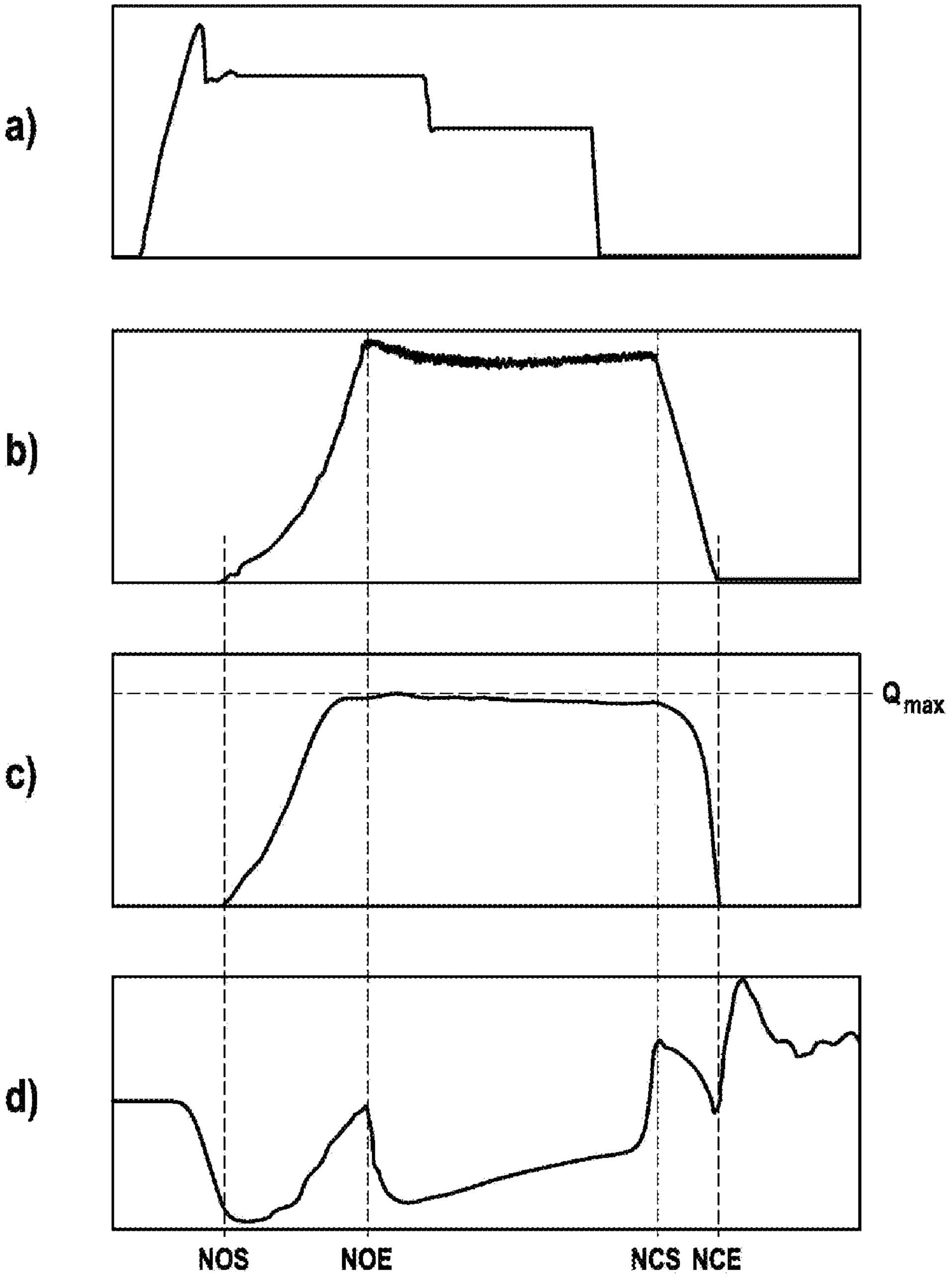

FIG. 3 shows by way of example the relationships between the nozzle needle stroke (FIG. 3*b*) and the sensor signal of the pressure sensor 5 (FIG. 3*d*). The sensor signal indicates both the start of the nozzle needle movement upon opening (time NOS) and the end of the nozzle needle movement upon opening (time NOE). Analogously, the start (NCS) and the end (NCE) of the nozzle needle movement upon closing may be derived from the sensor signal. The times NOS, NOE, NCS and NCE result in the injection rate curve shown in FIG. 3*c*) with a maximum injection rate Qmax. In contrast, the current curve shown in FIG. 3*a*) does not directly refer to the nozzle needle stroke, as there is a time delay between the control current and the movement of the nozzle needle 2.

Time and volume flow rate data can thus be derived from the sensor signal of the pressure sensor 5, which allows an injection rate model to be corrected to the current conditions as well as a corresponding adjustment of the control current. In this way, aging/wear of the injector 1 can also be considered when actuating.

Figure 1:
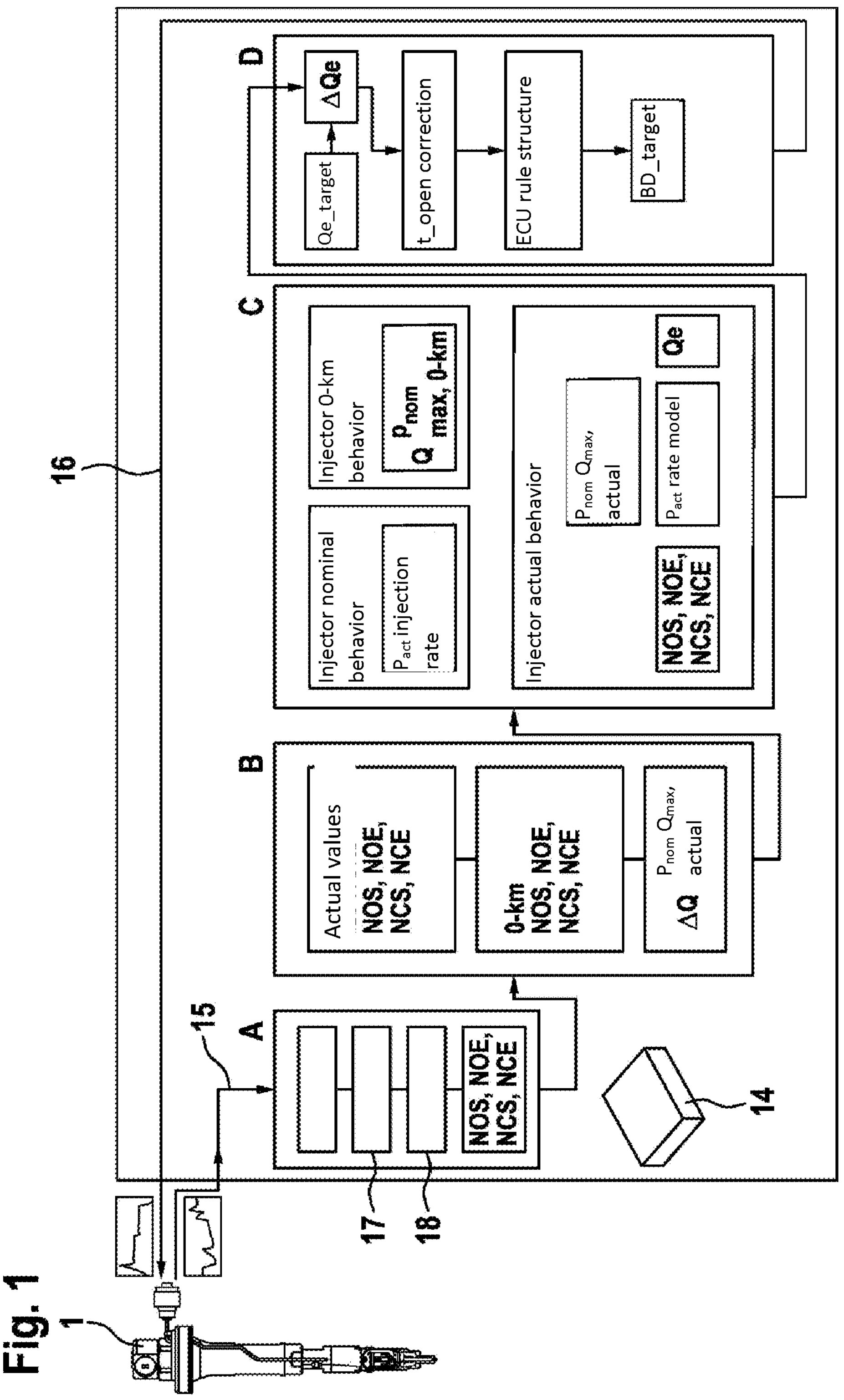
FIG. 1 a flow diagram for depicting a procedure of the method according to the invention, FIG. 2 *a*) a schematic longitudinal section through an injector, which can be actuated according to the method according to the invention, and *b*) an enlarged section of the injector, FIG. 3 various plots depicting the time curve *a*) the current curve, *b*) the nozzle needle stroke, *c*) the injection rate and *d*) the sensor signal of the pressure sensor, FIG. 4 various plots depicting the time curve *a*) the injection rate of a reference injector, *b*) the injection rate scaled by Qmax and *c*) the injection rate adjusted with the aid of the information from the pressure sensor, with linear operation of the injector (with stop), FIG. 5 various plots depicting the time curve *a*) the injection rate of a reference injector, *b*) the injection rate scaled by Qmax and *c*) the injection rate adjusted with the aid of the information from the pressure sensor, with ballistic operation of the injector (without stop), FIG. 6 graph of the transformation of the time axis in the opening phase of the injector, FIG. 7 diagram depicting injection rate modeling in the closing phase of the injector in linear operation, FIG. 8 graph of the transformation of the time axis in the closing phase of the injector, FIG. 9 diagram depicting injection rate modeling in the closing phase of the injector in ballistic operation using the EOI threshold, FIG. 10 diagram depicting injection rate modeling in the closing phase of the injector in ballistic operation using ballistic points, and FIG. 11 diagram comparing a simplified injection rate model (dashed line) and a measured curve (solid line).

In FIG. 1, the essential steps of such a correction function are presented. In the present case, it comprises the four main steps A-D, which are carried out using a control unit 14. For this purpose, the sensor signal of the pressure sensor 5 integrated in the injector 1 is provided to the control unit 14 via a signal line 15.

Step A is for feature detection. The sensor signal is first processed with a low pass filter 17. Then the time data NOS, NOE, NCS, NCE is derived from the signal with the aid of a detection algorithm 18 stored in the control unit 14.

Step B is for drift detection. To detect a change in the injection behavior of the injector 1 over the runtime, also called the drift, the time data NOS, NOE, NCS, NCE derived from the sensor signal in step A is stored, namely at different system pressures and/or energizing durations, in order to be able to calculate the change in the maximum injection rate Qmax. For the calculation, correlations between the time data NOS, NOE, NCS, NCE, the maximum injection rate Qmax and the nozzle needle stroke are used. These correlations are determined experimentally beforehand.

For this purpose, the needle closing time tclosing=NCE−NCS can be examined at two different system pressures in an operating range in which the nozzle needle rises up to a top stop. The experiment is preferably designed to measure relevant variations in needle stroke and nozzle flow. According to the equation (1), the relationship for the two system pressures can then be determined. The further the two system pressures are apart, the more accurately the nozzle needle stroke and maximum injection rate Qmax can be determined. This is due to the fact that the coefficients a and b are also far apart at widely separated system pressures, and thus the difference in the slope of the two straight lines according to the equation (1) is greater.

In the equation (1), a, b, and c at system pressure psys are experimentally determined specific constants. The change in injector flow may be determined according to the equation (2). Time data stored in the control unit at 0-km with the currently measured time data according to the equation (3) are preferably used for the determination.

the maximum injection rate of the controlled injector at nominal pressure pnom.

is calculated with the 0-km measurement of the controlled injector.

With these correlations, the change in the maximum injection rate of the injector at nominal pressure can be determined. The result may then be used in step C (see FIG. 1) as the input value for the injection rate model.

As already mentioned, the injection rate model is based on a measured injection rate curve, in contrast to the prior art. Preferably, the injection rate curve of a nominal injector is measured at various system pressures and long energizing duration and stored in the control unit for reference. The rate information consists of time data "t" and associated volume flow rate data "Q".

In a first calculation step of the injection rate model, a scaling of the nominal volume flow rate data according to the existing system pressure pactual is preferably carried out with the coefficient k1, which is defined by the equation (4).

is the maximum injection rate of the reference injector at nominal pressure. The other input value, which specifies the maximum injection rate of the controlled injector, is calculated according to the equation (2). These steps are shown graphically in each case in FIGS. 4*a*)-*c*) for linear operation and in FIGS. 5*a*)-*c*) for ballistic operation.

At operating points where the opening nozzle needle reaches a stop (linear operation), the scaled injection rate curve is adjusted with the aid of time data NOS, NOE, NCS, NCE (see FIG. 4*c*)). At the same time, the time axis of the reference rate curve is adjusted with the aid of the actual timing. A difference between the time data NOS of the reference injector and the controlled injector is taken into account, preferably by correcting the time axis around this value according to the equation (5), in which Pactual is the current system pressure.

Figure 6:
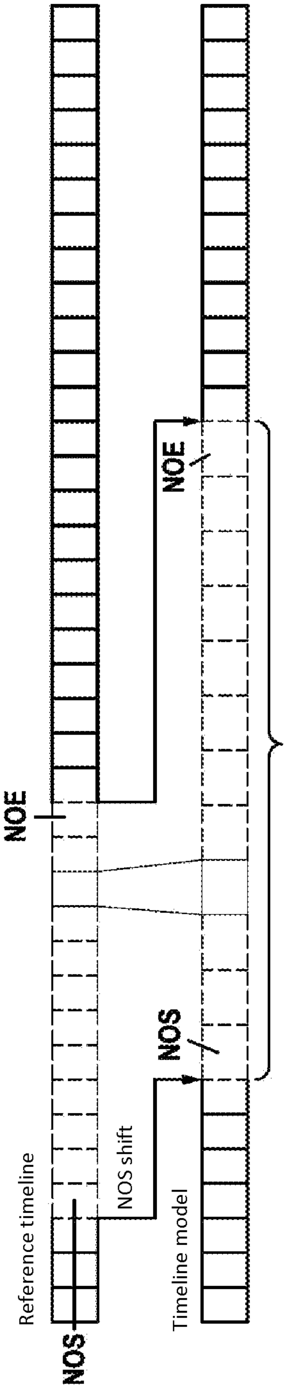

The modeling of the opening phase is preferably carried out by transforming the time axis from the nominal opening time (NOE-NOS) to the opening time of the controlled injector. In particular, a linear transformation can be applied, as shown for example in FIG. 6. The transformation may use various mathematical models, for example polynomial, exponential, or logarithmic, and/or may occur only over a particular portion of the opening phase.

A difference between the time data NOE of the reference injector and the controlled injector is taken into account, preferably by correcting the time axis around this value according to the equation (6).

Figure 7:
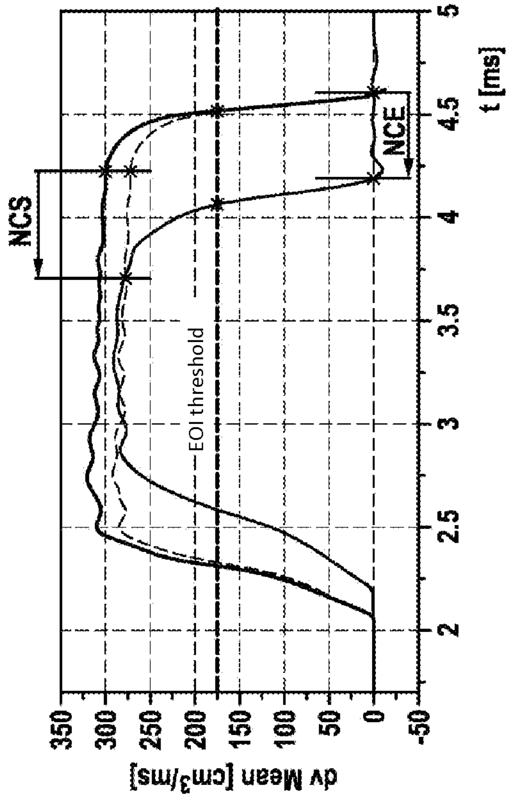

At the start of needle closing of the controlled injector, the injection rate curve is modified and the closing is modeled. The closing procedure of the reference measurement is used for this purpose. Thus, with the reference injection rate of a long injection, all linear points may be calculated (see FIG. 7).

If NOE of the controlled injector is greater than NOE of the reference injector, the injection rate curve in this range may be approximated by linear extrapolation. Preferably, however, a measurement with the maximum possible energizing duration is used as a reference in order to avoid this additional calculation step.

Preferably, an additional time is defined for modeling closing, namely the time EOI threshold from which the modeled closing operation is the same as that of the reference. A similar transformation of the time axis is applied as before in the opening phase between the NCS and EOI threshold. The EOI threshold is defined according to the equation (7) as a fraction of the flow at time NCS, wherein the model parameter k2 ε]0;1[.

Figure 8:
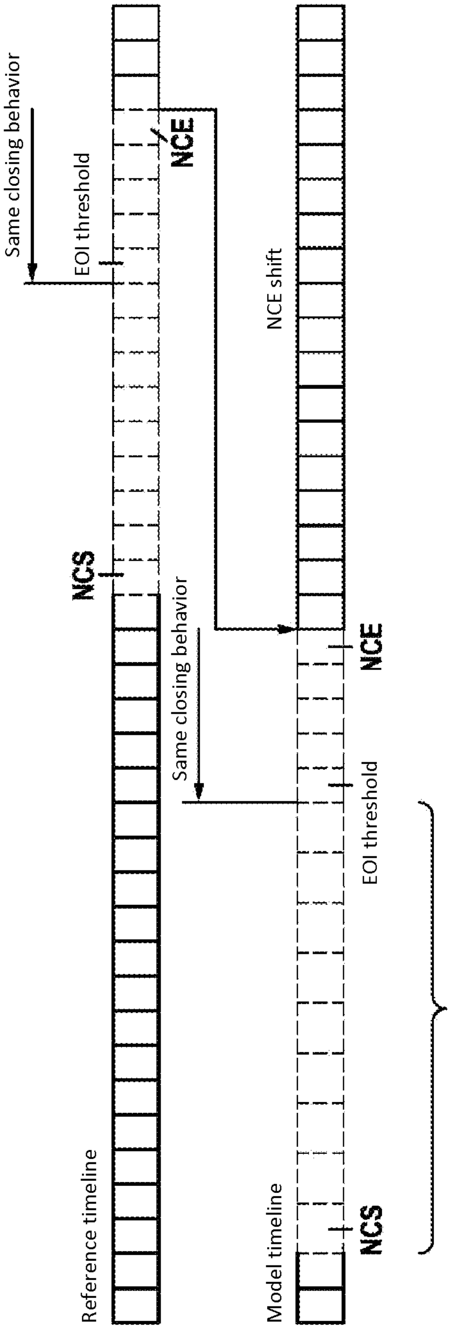

The overall modeling of the time axis upon closing is shown by way of example in FIG. 8.

Figure 9:
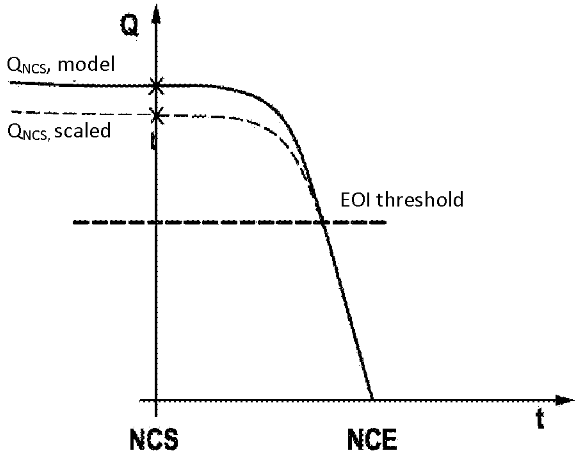

Furthermore, the scaled injection rate curve of the reference injector is preferably transformed during the closing phase to give the continuity of the modeled rate curve. This is illustrated in FIG. 9 by way of example.

Figure 4:
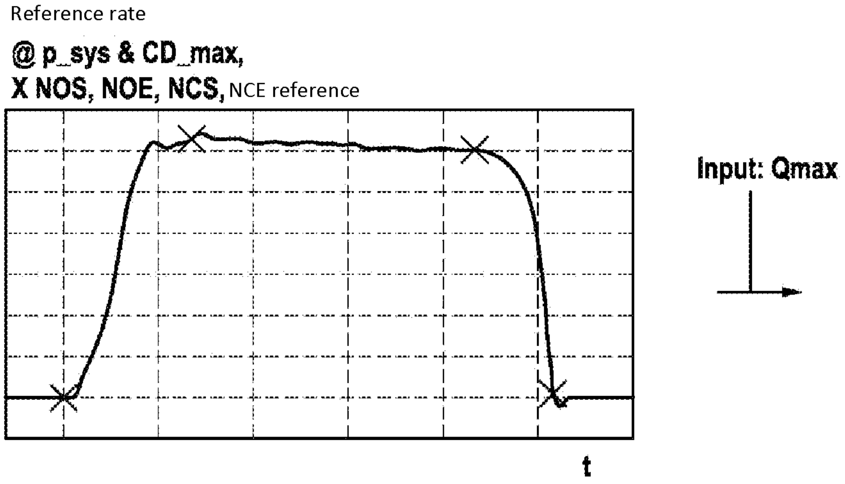
Figure 4:
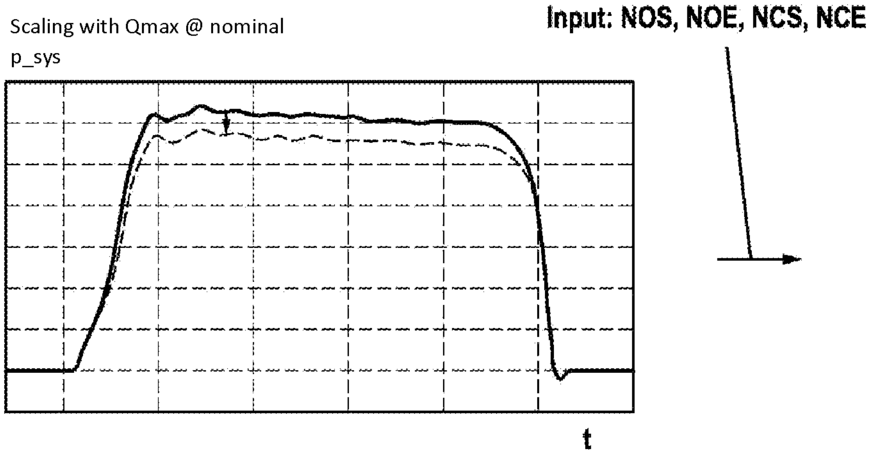
Figure 4:
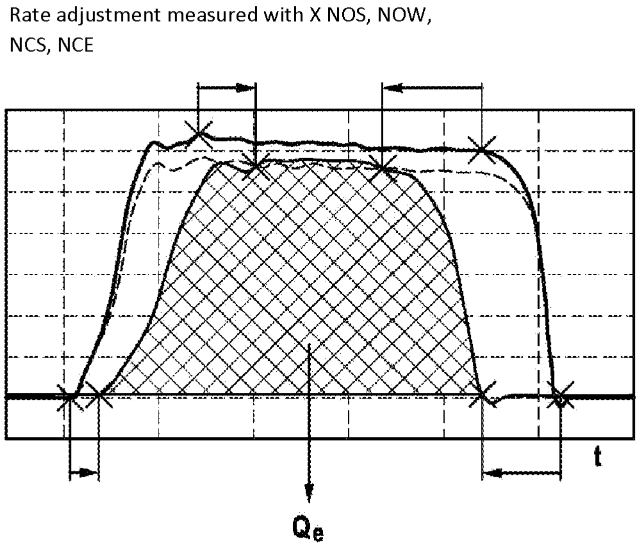
Figure 5:
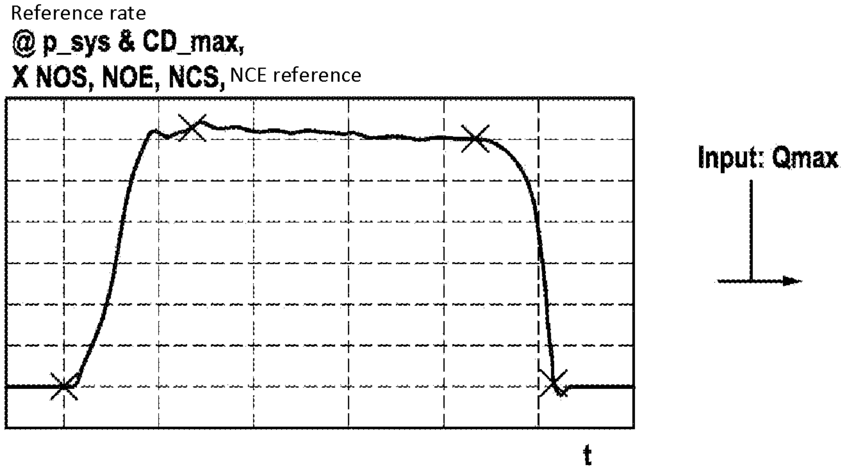
Figure 5:
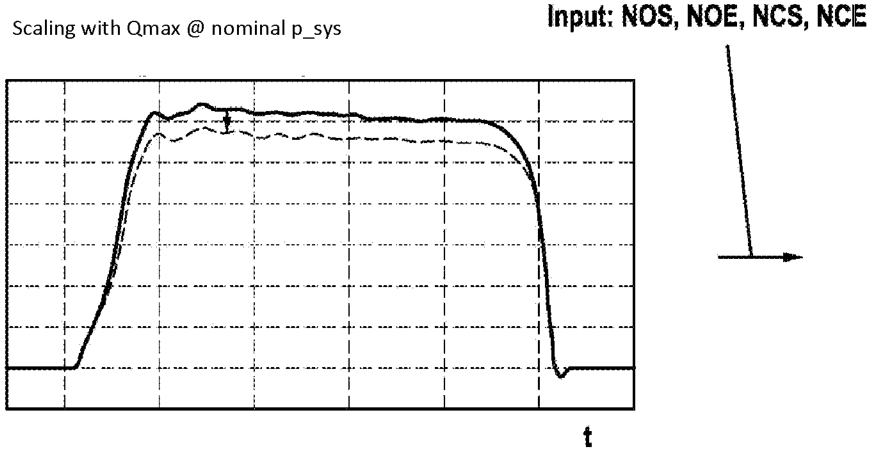
Figure 5:
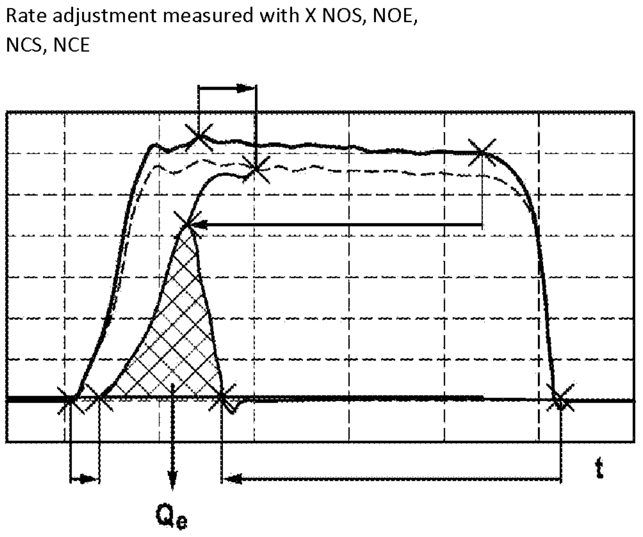

The transformation processes described generate a modeled injection rate, the integration of which can be used to calculate the injection quantity (see FIG. 4*c*). The slope of the rising and falling flanks can also be used as characteristic values for describing the state of the injector function by averaging the derivative.

No time NOE exists at operating points where the opening nozzle needle does not reach its stop (ballistic operation). The transformation in the opening phase can still be applied analogously to the transformation in linear operation. As NOE is not available, this information is taken from actual learning values of the linear operation. In principle, the modeled injection rate follows the opening flank calculated above until the closing phase is initiated. In addition, the model parameters Δt and ΔQ are introduced and explained using FIG. 10. Accordingly, Δt is defined so that at the time NCS, Δt reaches the maximum injection rate Qmax at the scaled reference rate. Thus, Qmax is calculated at point B at the time NCS. ΔQ is defined so that at the time when the injection rate Qmax ΔQ reaches point A, the modeled injection rate no longer follows the reference rate.

Studies have shown that Δt and ΔQ can be defined with the time constants k3 and k4 specified in equations (8) and (9), which lead to good model results.

The equations (8) and (9) have the needle opening time of the modeled curve NCS-NOS, and the needle opening time of the controlled injector for linear operating points or a learning parameter.

The curve profile between points A and B is preferably modeled with a parabola.

Figure 10:
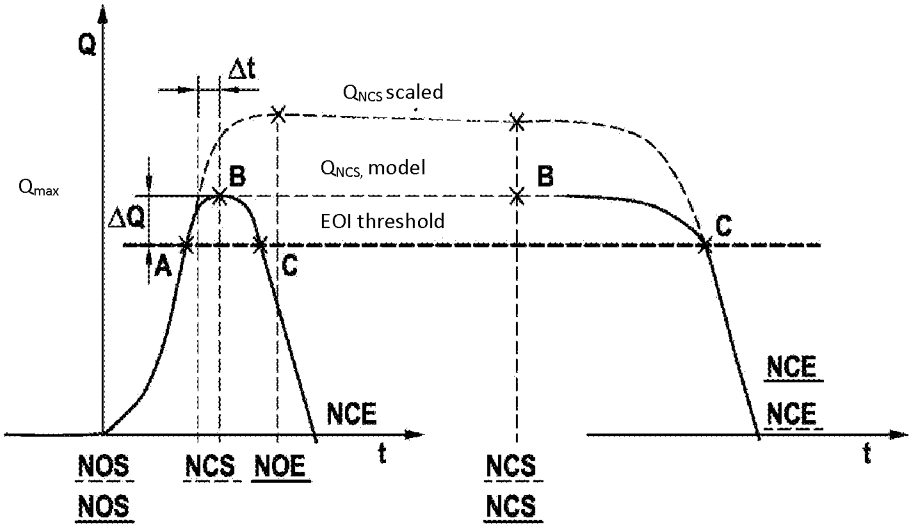
Figure 11:
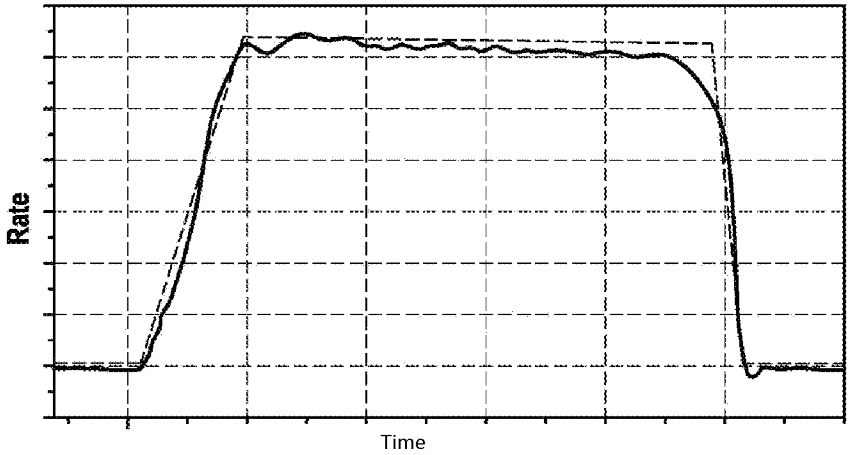

Between points B and C, the same transformation is then carried out as for the linear operating range (see right side of the diagram of FIG. 10).

In step D (see FIG. 1), the estimated injection amount may then be converted to a change in the electric actuation duration. The determined deviation of the actual injection amount is preferably applied as a factor to the injection duration. A correspondingly adjusted control current is directed to the injector 1 via a control line 16 from the control unit 14.

The invention claimed is:

1. A method for actuating an injector (1), the method comprising:

controlling a stroke movement of a nozzle needle (2) for opening and closing an injection opening (3) via a pressure in a control chamber (4), and measuring the pressure in the control chamber (4) via a pressure sensor (5) integrated into the injector (1), wherein characteristic information, including time and volume flow rate data, is derived from a sensor signal from the pressure sensor (5) for the stroke movement of the nozzle needle (2), and is used to correct an injection rate model that is based on previously measured time and volume flow rate data.

2. The method according to claim 1, wherein the following information, including time and volume flow rate data, is derived from the sensor signal of the pressure sensor (5) and used for the correction of the injection rate model:

start of opening movement of nozzle needle (NOS), end of opening movement of nozzle needle (NOE), start of closing movement of nozzle needle (NCS), end of closing movement of nozzle needle (NCE) and maximum injection rate (Qmax).

3. The method according to claim 2, wherein the time data (NOS, NOE, NCS, NCE) is derived from the sensor signal of the pressure sensor (5) by means of a detection algorithm that uses derivatives and/or averaging of the sensor signal.

4. The method according to claim 2, wherein the maximum injection rate (Qmax) is determined from the time data (NOS, NOE, NCS, NCE).

5. The method according to claim 4, wherein to determine the maximum injection rate (Qmax), experimentally determined and stored correlations which exist between the time data (NOS, NOE, NCS, NCE), the maximum injection rate (Qmax) and the stroke movement of the nozzle needle (2) are used in advance.

6. The method according to claim 2, wherein a corrected curve of the maximum injection rate (Qmax) is calculated by mathematically transforming the information derived from the sensor signal of the pressure sensor (5), including the time and volume flow rate data.

7. The method according to claim 6, wherein only the time data (NOS, NOE, NCS, NCE) derived from the sensor signal of the pressure sensor (5 is used in the mathematical transformation of the time data.

8. The method according to claim 1, wherein the corrected injection rate model is used to calculate an injection amount by integrating a corrected curve of a maximum injection rate (Qmax).

9. The method according to claim 8, wherein the calculated injection amount is converted to a change in an electric actuation duration, wherein a determined deviation of an actual injection amount is applied as a factor on a spray duration.

10. A control unit configured to carry out a method according to claim 1.

* * * * *